though the invention is not limited thereto. Parts

United States Patent Office 3,036,036
Patented May 22, 1962

3,036,036
PHENOLPHTHALEIN-POLYCARBONATE RESINS
Joseph H. Howe, Freeland, Mich., assignor to The Dow
Chemical Company, Midland, Mich., a corporation of
Delaware
No Drawing. Filed May 31, 1960, Ser. No. 32,574
11 Claims. (Cl. 260—47)

This invention relates to a new and useful class of resinous polycarbonate materials. More particularly the present invention concerns polycarbonate resins having improved physical and chemical properties not exhibited by the conventional polycarbonate resins.

Polycarbonate resins have been known to the plastics art for some time. These resins are notably tough and rigid and have high melting points. For some purposes however, it is necessary to have plastics of even higher melting points than are exhibited by conventional polycarbonate resins while retaining good rigidity, toughness, and other desirable properties.

It is among the objects of the present invention to provide a new polycarbonate resin having improved chemical and physical properties.

A further object of the present invention is the provision of a unique class of polycarbonate resins having high molecular weights and high melting points.

Another object of the present invention is the provision of a polycarbonate resin having excellent resistance to dry cleaning solvents and high heat distortion temperatures.

A further object of the present invention is to produce polycarbonate resins of fiber and film forming quality and having low static accumulation.

Other objects and advantages of this invention will be evident in the following description.

It has now been found that the above objects are attained in a polycarbonate resin containing in the polymer chain the residues obtainable by removing hydroxyl hydrogens from phenolphthalein or certain derivatives of phenolphthalein, hereinafter referred to as phenolphthalein nucleus compounds. The new resins have recurring units corresponding to the structure

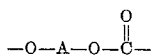

wherein —O—A—O— represents the divalent residue obtainable by removing the hydroxyl hydrogens from phenolphthalein nucleus compounds. A polymer of the structure

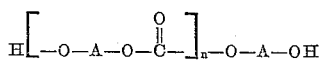

in which —O—A—O— represents the divalent residue above defined can be made by the phosgenation of phenolphthalein nucleus compounds. According to the present invention copolymers having divalent residues formable by removing the hydroxyl hydrogens from phenolphthalein nucleus compounds and from difunctional organic dihydroxy compounds other than phenolphthalein nucleus compounds have desirable properties attributable to the presence of the residues of phenolphthalein nucleus compounds. These latter polymers have recurring units corresponding to the structure

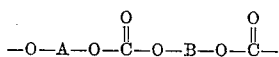

in which —O—B—O— is the divalent residue which can be obtained by removing hydroxyl hydrogens from difunctional organic dihydroxy compounds free of aliphatic unsaturation other than phenolphthalein nucleus compounds. In the above formula subscript $n$ is a positive integer greater than 10 and preferably greater than 20.

The phenolphthalein nucleus compounds which can be used in the production of the polycarbonate resins of the present invention are represented by the formula:

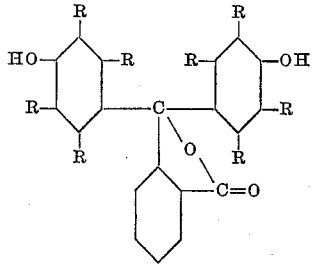

in which the R substituents are independently selected from the group consisting of H, lower alkyl radicals having 1–4 carbon atoms, Cl, Br, I, and $NO_2$. Representative examples of such compounds are $3',3'',5',5''$-tetrachlorophenolphthalein, $3',3'',5',5''$-tetraiodophenolphthalein, $3',3'',5',5''$ - tetrabromophenolphthalein, $3,3''$-dibromophenolphthalein, thymolphthalein, $3',3''$-dibromo-$5',5''$-dimethylphenolphthalein, ortho-cresolphthalein, $3'$-bromo-$5',5''$-dimethylphenolphthalein, dinitro-ortho-cresolphthalein, and phenolphthalein. In the above examples the hydroxyls are in the $4',4''$ positions. Phenolphthalein and the derivatives used to make the polycarbonates of this invention can be made by known methods, for example, by reacting phthalic anhydride with a monohydric phenol such as phenol, ortho-cresol, para-xylenol, ortho-ethylphenol, thymol, 2-isopropylphenol, 2,6-diiodophenol, 2,6-dibromophenol, 2-bromophenol, 2-bromo-6-methylphenol, 2-chloro-6-methylphenol, 2-nitro-6-methylphenol, 3,5-dichlorophenol and the like. Some of the derivatives used to make the polycarbonates of this invention can be made by halogenation of phenolphthalein, ortho-cresolphthalein, etc., as is known to the art.

In general the polymers of this invention can contain in addition to the residues of phenolphthalein nucleus compounds, residues obtained by the removal of the hydroxyl hydrogens from difunctional organic dihydroxy compounds free of aliphatic unsaturation. These dihydroxy compounds can be aromatic, aliphatic or cycloaliphatic, as for example, hydroquinone, 4,4'-dihydroxydiphenyl, ethylene glycol, alpha-propylene glycol, 1,4-cyclohexanediol, 1,3-cyclopentanediol, hexamethylene glycol, decamethylene glycol and the like.

The dihydroxy compounds useable with phenolphthalein nucleus compounds to make the polycarbonate resins of this invention include aralkyl, alkaryl, and hetero compounds, representative examples of which are: 4,4'-isopropylidenediphenol, 4,4'-cyclohexylenediphenol, 4,4'-methylenediphenol, 4,4'-isopropylidene-o-cresol, 4,4'-isopropylidenebis(2-phenylphenol), 4,4'-isopropylidenebis-(2-tert-butylphenol), 4,4'-sulfonyldiphenol, 4,4'-oxydiphenol, triethylene glycol, and dipropylene glycol. Halogenated polycarbonate forming derivatives of these compounds can also be used in conjunction with phenolphthalein nucleus compounds to make the resins of the present invention.

Polymers of this invention can be made by phosgenating a phenolphthalein nucleus compound or mixtures thereof in the presence or absence of one or more other dihydroxy compounds of the type indicated above. A phenolphthalein nucleus compound can be reacted with the bis (chloroformate) derivatives of one or more of the above indicated other dihydroxy compounds.

The following examples are illustrative of the present invention but the invention is not limited thereto. Parts and percentages are by weight unless otherwise indicated.

*Example I*

A sample of 3.3 grams of 4,4'-isopropylidenediphenol bis(chloroformate) in 100 milliliters of methylene chloride is added to 2.71 grams of phenolphthalein, 1.46 grams of sodium bicarbonate, 10 milliliters of 5 percent aqueous sodium hydroxide, 3 milliliters of 3 percent benzyltrimethylammonium chloride and 80 milliliters of water. The mixture containing a pink colored aqueous layer, is stirred for ½ hour with a high-speed mixer at room temperature resulting in a colorless emulsion. Stirring is continued for an additional hour during which time 5 percent aqueous sodium hydroxide is added dropwise to maintain the color of the reaction mixture pink. On standing overnight at room temperature the mixture separates into two layers. The supernatant aqueous layer is decanted and the methylene chloride portion is then extracted with slightly alkaline water. The methylene chloride portion is then added dropwise to 1 liter of 95 percent ethyl alcohol which is constantly stirred. A fine white precipitate thus formed is recovered by filtration and is further purified by washing and precipitation from solution and drying. The product has a molecular weight of 36,000, a melting point of 250° C. and is stable at 280° C. A clear fiber is drawn from a melt of the polymer at 280° C. When cool the fiber has a tenacity of 1.1 grams per denier and an elongation of 54 percent. Sparkling, clear films cast from a methylene chloride solution of the polymer have low static accumulation. These films are unaffected by water, 5 percent aqueous sodium hydroxide and carbon tetrachloride.

*Example II*

To 1.55 grams of 4,4'-isopropylidenediphenol, 1.43 grams of sodium bicarbonate, 0.54 gram of phenolphthalein, 10 milliliters of 5 percent aqueous sodium hydroxide, and 3 milliliters of 3 percent aqueous benzyltrimethylammonium chloride dissolved in 85 milliliters of water, is added 2.97 grams 4,4'-isopropylidenediphenol-bis(chloroformate) dissolved in 85 milliliters of methylene chloride. The mixture is stirred vigorously for one hour during which time 5 percent aqueous sodium hydroxide is added dropwise to maintain the color of the reaction mixture pink. After standing overnight at room temperature the mixture separates into two layers. The supernatant aqueous layer is decanted and the methylene chloride portion is extracted with water. The methylene chloride portion is then added dropwise to 500 milliliters of 95 percent ethyl alcohol and a fine white precipitate forms. The polymer is recovered by filtration followed by vacuum drying. This polymer melts at 205° C., has a heat distortion temperature of 195° C., and a molecular weight of 30,000. Good fibers can be pulled from a melt of the polymer at 207° C.

*Example III*

To 1.97 grams of diethylene glycol bis(chloroformate) dissolved in 80 milliliters of methylene chloride are added 2.67 grams of phenolphthalein, 1.43 grams of sodium bicarbonate, 10 milliliters of 5 percent aqueous sodium hydroxide, 3 milliliters of 3 percent aqueous benzyltrimethylammonium chloride and 80 milliliters of water. The reaction mixture is stirred for two hours during which time 5 percent aqueous sodium hydroxide is added dropwise to maintain the pink color in the reaction mixture. The methylene chloride layer is separated from the aqueous layer and added dropwise to 500 milliliters of 95 percent ethyl alcohol giving a stringy fibrous precipitate. The precipitate after washing and drying is white. This polymer has a melting point of 215° C., and a molecular weight of 36,000. A 4.5 denier fiber pulled from a melt of this polymer at 220° C. has a tenacity of 1.63 grams per denier and an elongation of 28 percent.

*Example IV*

A charge of 2.13 grams of 4,4'-sulfonyldiphenol, 2.67 grams of phenolphthalein, 80 milliliters of water and 2.1 grams of sodium hydroxide is placed in a 250 milliliter beaker. With moderate stirring, phosgene, at room temperature, is introduced through a sparger into the reaction mixture for ¾ hour, at the end of which time the reaction mixture becomes colorless. The reaction mixture is then placed in a 500 milliliter flask equipped with a paddle stirrer. There are then added 150 milliliters of methylene chloride and 3.4 milliliters of a 3 percent aqueous solution of benzyltrimethylammonium chloride. The mixture is stirred rapidly while 10 milliliters of 10 percent aqueous sodium hydroxide are added at the rate of ½ milliliter per minute. Stirring is continued for an additional 2 hours and 10 minutes. The methylene chloride layer is separated from the aqueous layer and the latter is acidified and extracted with methylene chloride. The extract is added to the methylene chloride previously separated. This product is washed with dilute acid, and added dropwise to 500 milliliters of 95 percent ethanol to give a fine white precipitate. The precipitate is recovered by filtration and is then washed and dried. This copolymer has a high melting point and a relative viscosity in dioxane of 1.10. Fibers are pulled from a melt of this polymer at 290° C. A clear film is cast from a methylene chloride solution of the polymer.

*Example V*

The procedure of Example IV is repeated substituting 2,4'-sulfonyldiphenol for the 4,4'-sulfonyldiphenol. This copolymer has a molecular weight in excess of 10,000 and a high melting point. Fibers and films can be made from the copolymer of this example.

*Example VI*

Phenolphthalein (382 grams) and 144 grams of sodium hydroxide are dissolved in 4800 milliliters of water contained in a 20 liter jar equipped with a paddle stirrer. A total of 200 grams of phosgene are bubbled into the solution at the rate of about 3.8 grams per minute. The solution is stirred rapidly during the introduction of the phosgene. Methylene chloride (1800 milliliters) is then added with stirring. On standing the contents of the jar separate into two layers. The supernatant water layer is decanted and the remaining methylene chloride layer is washed with 4000 milliliters of water. There are then added with stirring 6 milliliters of 80 percent aqueous benzyltrimethylammonium chloride, 2080 milliliters of water and 37 grams of sodium hydroxide. Stirring is continued for an hour and a half. On standing overnight at room temperature, the emulsion thus formed separates sharply into a deep red upper aqueous layer and a slightly cloudy lower methylene chloride layer. The aqueous layer is decanted. The methylene chloride layer is washed with slightly alkaline water, acidified with concentrated hydrochloric acid, again water washed. The polymer is precipitated by pouring the methylene chloride solution into a large volume of 95 percent ethanol. The fine white precipitate obtained is recovered by filtration and vacuum dried. This phenolphthalein-polycarbonate resin has a melting point of 270° C. and a molecular weight of about 20,000.

In a manner similar to that of the foregoing Example IV ortho-cresolphthalein is reacted with phosgene, dinitro-ortho-cresolphthalein is reacted with phosgene, 3',3'',5',5''-tetrachlorophenolphthalein is reacted with phosgene, 3',3'',5',5''-tetrabromophenolphthalein is reacted with phosgene, 3',3'',5',5''-tetraiodophenolphthalein is reacted with phosgene, 3',3''-dibromophenolphthalein is reacted with phosgene, thymolphthalein is reacted with phosgene, 3',3''-dibromo-5'5''-dimethylphenolphthalein is reacted with phosgene, each reaction taking place in the presence of 4,4'-sulfonyldiphenol to prepare copolymers having high melting points and molecular weights in excess of 10,000 and physical properties similar to the copolymer obtained in Example IV above.

Fibers made from the polymers and copolymers of this invention exhibit no appreciable change in tenacity when soaked in 1,1,2,2-tetrachloroethane or carbon tetrachloride for 30 minutes and then air dried for 15 minutes at 100° C., whereas fibers from other polycarbonate resins lose half of their tenacity under such treatment. Similarly fibers made from polymers and copolymers of this invention show no appreciable change in tenacity by being soaked for 1 hour in 1.5 percent aqueous sodium carbonate at 92° C. followed by water washing and drying at 100° C. for 30 minutes. The polymers and copolymers of the present invention have heat distortion temperatures of about 200° C. whereas commercial polycarbonate resins have heat distortion temperatures of only about 150° C.

The polymers and copolymers of this invention can be mixed with dyes, delusterants, pigments, fillers, reinforcing materials and other polymers. They can be fabricated into useful articles such as films, fibers, tubes, rods and the like from a melt or solution thereof by conventional shaping techniques such as molding, casting and extruding. The resins can also be used as protection or decorative coatings and to make laminates such as safety glass.

That which is claimed is:

1. A polycarbonate resin having in the polymer molecule units of the structure

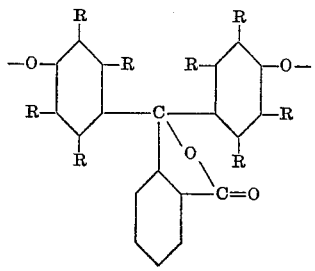

in which the hexagons represent benzene rings and the R substituents are independently selected from the group consisting of H, an alkyl radical having from 1 to 4 carbon atoms, Cl, Br, I, and NO₂.

2. A polycarbonate resin according to claim 1 in which the R substituents are hydrogen.

3. A polycarbonate resin having the formula

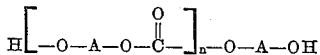

in which —O—A—O— represents residues obtainable by removing hydroxyl hydrogens from compounds of the formula

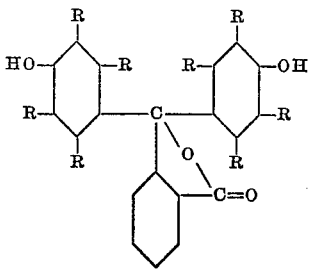

in which the hexagons represent benzene rings and the R substituents are independently selected from the group consisting of H, an alkyl radical having from 1 to 4 carbon atoms, Cl, Br, I, and NO₂.

4. A polycarbonate resin according to claim 3 in which R is hydrogen.

5. A polycarbonate resin having in the polymer molecule units of the structure

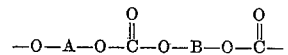

in which —O—A—O— represents residues obtainable by removing hydroxyl hydrogens from compounds of the formula

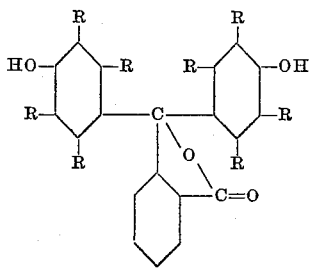

in which the hexagons represent benzene rings and the R substituents are independently selected from the group consisting of H, an alkyl radical having from 1 to 4 carbon atoms, Cl, Br, I, and NO₂, and —O—B—O— represents residues obtainable by removing hydroxyl hydrogens from difunctional organic dihydroxy compounds free of aliphatic unsaturation.

6. A polycarbonate resin according to claim 5 in which the R substituents are hydrogen.

7. A polycarbonate resin according to claim 5 in which —O—B—O— is the residue obtainable by removing the hydroxyl hydrogens from 4,4'-isopropylidenediphenol.

8. A polycarbonate resin according to claim 7 in which the R substituents are hydrogen.

9. A polycarbonate resin according to claim 5 in which —O—B—O— is the residue obtainable by removing the hydroxyl hydrogens from 4,4'-sulfonyldiphenol.

10. A polycarbonate resin according to claim 5 in which —O—B—O— is the residue obtainable by removing the hydroxyl hydrogens from 2,4'-sulfonyldiphenol.

11. A polycarbonate resin according to claim 5 in which —O—B—O— is the residue obtainable by removing the hydroxyl hydrogens from diethylene glycol.

References Cited in the file of this patent

UNITED STATES PATENTS 2,035,578    Wagner _____ Mar. 31, 1936